(12) United States Patent
Darr et al.

(10) Patent No.: US 11,731,770 B2
(45) Date of Patent: Aug. 22, 2023

(54) DUAL-FLOW NOZZLE FOR DISPERSING A HIGH-PRESSURE FLUID AND A LOW-PRESSURE FLUID

(71) Applicant: The Boeing Company, Chicago, IL (US)

(72) Inventors: Rachel Darr, Renton, WA (US); Charles Steven Meis, Renton, WA (US)

(73) Assignee: The Boeing Company, Chicago, IL (US)

( * ) Notice: Subject to any disclaimer, the term of this patent is extended or adjusted under 35 U.S.C. 154(b) by 588 days.

(21) Appl. No.: 16/524,409

(22) Filed: Jul. 29, 2019

(65) Prior Publication Data

US 2021/0031931 A1 Feb. 4, 2021

(51) Int. Cl.
  *B64D 25/00* (2006.01)
  *A62C 3/08* (2006.01)
  *B05B 1/30* (2006.01)

(52) U.S. Cl.
  CPC .............. *B64D 25/00* (2013.01); *A62C 3/08* (2013.01); *B05B 1/3006* (2013.01)

(58) Field of Classification Search
  CPC .......... A62C 3/08; B64D 25/00; B05B 1/3006
  USPC ....................................................... 239/11
  See application file for complete search history.

(56) References Cited

U.S. PATENT DOCUMENTS

| 2,813,753 | A | * | 11/1957 | Roberts | B05B 1/14 |
| | | | | | 239/271 |
| 4,484,710 | A | * | 11/1984 | Rozniecki | A62C 31/00 |
| | | | | | 239/290 |
| 4,524,911 | A | * | 6/1985 | Rozniecki | B05B 1/083 |
| | | | | | 239/101 |
| 5,439,175 | A | | 8/1995 | Katayama | |

(Continued)

FOREIGN PATENT DOCUMENTS

| WO | 2007051897 A1 | 5/2007 |
| WO | 2008034445 A1 | 3/2008 |

OTHER PUBLICATIONS

"Guide to spray properties" BETE www.spray-nozzle.co.ukdocsdefault-sourcedefault-document-librarywhats-in-a-spray.pdf (Year: 2016).*

(Continued)

*Primary Examiner* — Tuongminh N Pham
*Assistant Examiner* — Kevin Edward Schwartz
(74) *Attorney, Agent, or Firm* — Vivacqua Crane PLLC

(57) ABSTRACT

A nozzle configured to receive and disperse a high-pressure fluid or a low-pressure fluid is disclosed. The nozzle includes a nozzle body defining an open end, a closed end, and a side wall connecting the open end to the closed end, where the open end of the nozzle body configured to receive either the high-pressure fluid or the low-pressure fluid. The side wall defines a plurality of low-pressure apertures, a plurality of high-pressure apertures, and a compressible member positioned within the nozzle body. The plurality of high-pressure apertures are positioned downstream from the plurality of pressure apertures. The low-pressure apertures (Continued)

are smaller in size by a predefined ratio when compared to the high-pressure apertures. The compressible member is in an expanded position and blocks the plurality of high-pressure apertures when the open end of the nozzle body receives the low-pressure fluid.

20 Claims, 9 Drawing Sheets

(56) References Cited

U.S. PATENT DOCUMENTS

| | | | | |
|---|---|---|---|---|
| 5,513,708 | A * | 5/1996 | Sundholm | A62C 99/0072 169/37 |
| 5,810,090 | A | 9/1998 | Sundholm | |
| 5,845,714 | A | 12/1998 | Sundholm | |
| 6,375,757 | B2 * | 4/2002 | Gazewood | B08B 9/0433 134/24 |
| 7,318,555 | B1 * | 1/2008 | Ueda | B08B 9/0813 134/168 R |
| 9,821,179 | B2 * | 11/2017 | Kristensen | A62C 31/05 |
| 10,286,240 | B2 * | 5/2019 | Cerruti | A62C 99/0072 |
| 2005/0011652 | A1 * | 1/2005 | Hua | A62C 31/05 169/37 |
| 2014/0138102 | A1 * | 5/2014 | Corn | A62C 31/02 169/14 |
| 2016/0250652 | A1 * | 9/2016 | Al-Ansary | B05B 1/14 239/11 |

OTHER PUBLICATIONS

"Calculation of Flow Through Nozzle and Orifices", Feb. 11, 2015, Neutrium, <https://neutrium.net/fluid-flow/calculation-of-flow-through-nozzles-and-orifices/>, 8 Pages (Year: 2015).*

EP, Extended European Search Report, EP Patent Application No. 20188170.3-1113 (dated Nov. 9, 2020).

* cited by examiner

DUAL-FLOW NOZZLE FOR DISPERSING A HIGH-PRESSURE FLUID AND A LOW-PRESSURE FLUID

INTRODUCTION

The present disclosure relates to a nozzle. More particularly, the present disclosure relates to a nozzle configured to receive and disperse either a high-pressure fluid or a low-pressure fluid.

BACKGROUND

An aircraft includes several types of suppression systems that are designed to control or extinguish fires when the aircraft is in flight or on the ground. For example, one type of suppression system may be activated by a flight crew in response to detecting smoke in an isolated aircraft compartment. Many suppression systems first provide an initial discharge of a fire suppression agent. The initial discharge is referred to as an initial or knock-down discharge, since the suppression agent is deployed for a short period of time at a relatively high flow rate. The knock-down discharge is then followed by a second discharge of the suppression agent. In contrast to the knock-down discharge, the second discharge deploys the suppression agent gradually over a longer period of time, or for the remainder of the flight, in order to prevent re-ignition. Accordingly, the second discharge is referred to as the metered discharge.

The suppression system includes containers for storing the suppression agent, distribution tubing, and multiple nozzles for distributing the suppression agent throughout the aircraft compartment. When the suppression system is activated, the suppression agent is first released from the containers, flows through the distribution tubing, and exits the nozzles and into the aircraft compartment. However, a relatively high percentage of suppression agent may be required. For example, some compartments may require a five percent concentration of a legacy suppression agent during the knock-down discharge, and a concentration of about three percent during the metered phase. In contrast, some alternative suppression agents may require two to three times the concentration of the legacy agent to create the same suppression effects.

If the concentration of an alternative suppression agent during the knock-down discharge is higher, then it follows that the amount of suppression agent being discharged into the aircraft compartment is also higher. However, the amount of suppression agent released during the metered discharge does not necessarily increase proportionally. Therefore, the suppression agent may not need to flow at a higher rate during the metered discharge in order to provide the correct concentration. As a result, it may be challenging to design a discharge nozzle for the suppression system since the suppression agent may need to be released at different flow rate during the knock-down discharge versus the metered discharge. One solution is to provide a suppression system having two different sets of nozzles, distribution tubing, and containers for the knock-down discharge and the metered discharge. However, this approach doubles the cost, weight, and volume of the suppression system.

SUMMARY

According to several aspects, a nozzle configured to receive and disperse a high-pressure fluid or a low-pressure fluid is disclosed. The nozzle includes a nozzle body defining an open end, a closed end, and a side wall connecting the open end to the closed end. The open end of the nozzle body is configured to receive either the high-pressure fluid or the low-pressure fluid. The side wall defines a plurality of low-pressure apertures and a plurality of high-pressure apertures positioned downstream from the plurality of pressure apertures. The low-pressure apertures are smaller in size by a predefined ratio when compared to the high-pressure apertures. The nozzle also includes a compressible member positioned within the nozzle body. The compressible member is in an expanded position and blocks the plurality of high-pressure apertures when the open end of the nozzle body receives the low-pressure fluid, and the compressible member is configured to compress into a constricted position in response to the open end of the nozzle body receiving the high-pressure fluid.

In another aspect, a two-way nozzle configured to receive and disperse a high-pressure fluid or a low-pressure fluid is disclosed. The two-way nozzle includes a nozzle body defining an open end, a high-pressure branch, and a low-pressure branch. The high-pressure branch defines a high-pressure closed end and the low-pressure branch defines a low-pressure closed end. The nozzle body defines a plurality of low-pressure apertures positioned at the low-pressure branch and a plurality of high-pressure apertures positioned at the high-pressure branch. The low-pressure apertures are smaller in size by a predefined ratio when compared to the high-pressure apertures. The two-way nozzle further includes a diverter gate positioned within the nozzle body between the high-pressure branch and the low-pressure branch. The diverter gate is moveable between a high-pressure position and a low-pressure position. The diverter gate blocks the low-pressure branch when in the high-pressure position and blocks the high-pressure branch when in the low-pressure position. The two-way nozzle further includes a biasing element operatively connected to the diverter gate. The biasing element is configured to exert a biasing force upon the diverter gate, and the biasing force normally biases the diverter gate in the low-pressure position.

In still another aspect, a method of operating a nozzle is disclosed. The nozzle includes a nozzle body defining an open end and a closed end. The method includes receiving, by the open end of the nozzle body, a high-pressure fluid. In response to receiving the high-pressure fluid, the method includes moving a compressible member from an expanded position into a constricted position to uncover a plurality of high-pressure apertures. The plurality of high-pressure apertures are located downstream of the plurality of low-pressure apertures. The method also includes allowing the high-pressure fluid to exit the nozzle through both of the plurality of high-pressure apertures and the plurality of low-pressure apertures. The method also includes receiving, by the open end of the nozzle, a low-pressure fluid. Finally, the method includes allowing the low-pressure fluid to exit the nozzle through a plurality of low-pressure apertures.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a nozzle that operates in dual modes. The nozzle includes a nozzle body defining an open end, a closed end, and a side wall connecting the open end to the closed end. The side wall defines a plurality of low-pressure apertures and a plurality of high-pressure apertures positioned downstream from the plurality of low-pressure apertures, where the low-pressure apertures are smaller in size by a predefined ratio when compared to the high-pressure apertures. When the nozzle receives a low-pressure fluid, then the low-pressure fluid exits the nozzle through only the low-pressure apertures. However, when the nozzle receives the high-pressure fluid, the high-pressure fluid exits the nozzle through both the high-pressure apertures and the low-pressure apertures.

The following description is merely exemplary in nature and is not intended to limit the present disclosure, application, or uses.

Figure 1:
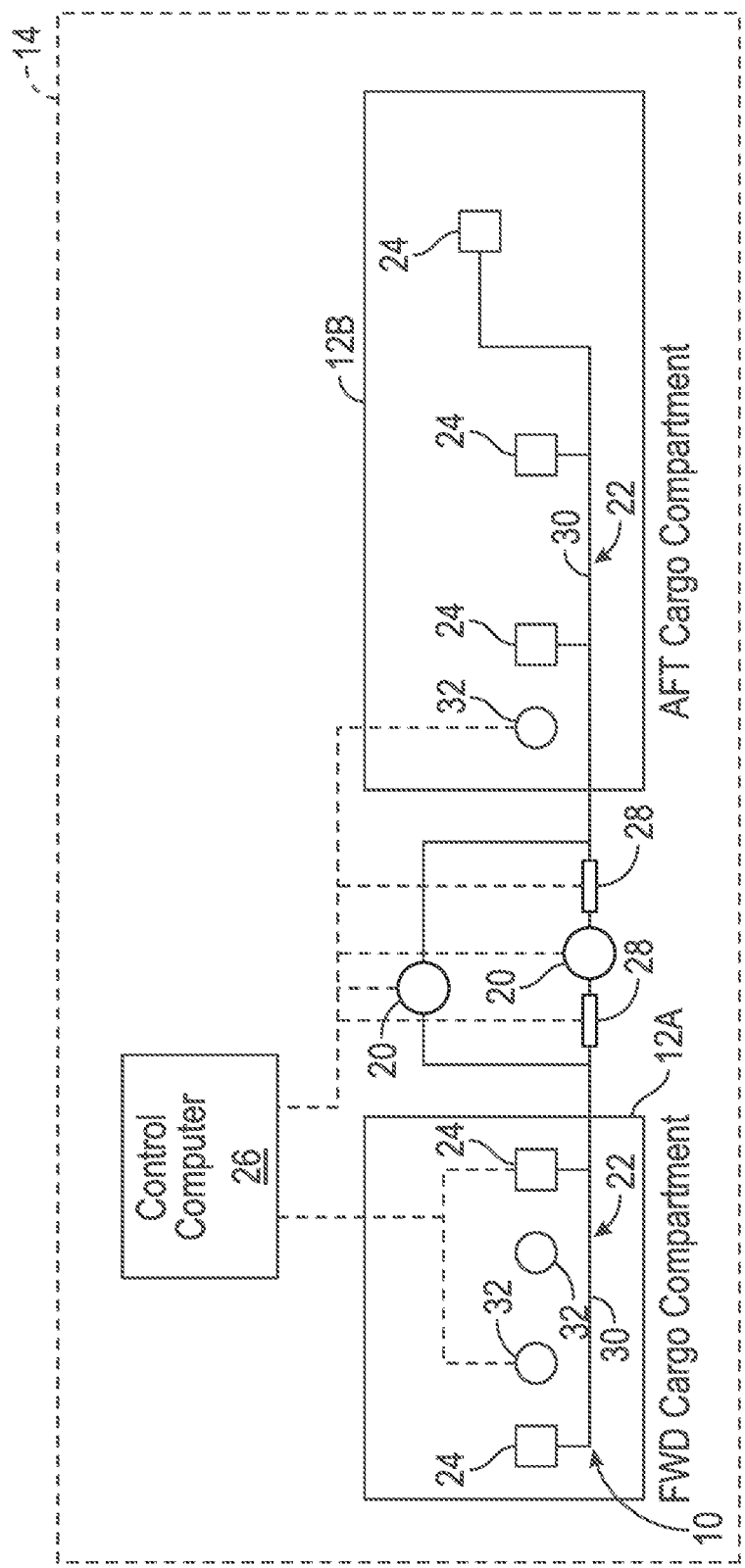
FIG. 1 is a schematic diagram of a suppression system including containers for storing a suppression agent, distribution tubing, and a plurality of dual-mode nozzles, according to an exemplary embodiment.

Referring to FIG. 1, a schematic diagram of an exemplary suppression system 10 for controlling or extinguishing fires.

In the non-limiting embodiment as shown in FIG. 1, the suppression system 10 is placed within one or more cargo compartments 12 of a vehicle 14. For example, in one embodiment the vehicle 14 is an aircraft having a forward cargo compartment 12A and an aft cargo compartment 12B. The suppression system 10 includes one or more containers 20 for storing a suppression agent, a distribution tubing system 22, one or more nozzles 24, a control computer 26, and one or more metering units 28. Although FIG. 1 illustrates two metering units 28, only a single metering unit 28 may be used as well. The suppression agent is any type of agent that is used for controlling fires such as, but not limited to, bromotrifluoromethane. The metering units 28 are fluidly connected to the containers 20 and are configured to control the amount of suppression agent released into the distribution tubing system 22. The distribution tubing system 22 includes a plurality of pipes 30 that are fluidly connected to the containers 20, and nozzles 24 are fluidly connected to the containers 20 by the pipes 30. The containers 20 release the suppression agent into the pipes 30 of the distribution tubing system 22. The suppression agent is then expelled from the suppression system 10 through the nozzles 24 and into the cargo compartments 12.

The control computer 26 is in electronic communication with the containers 20, the metering units 28, and a plurality of detectors 32, however, in another embodiment the control computer 26 may not be in electronic communication with the metering units 28. The detectors 32 are placed along a ceiling (not visible in FIG. 1) of the cargo compartment 12. The detectors 32 are any device for detecting a fire such as, for example, a photoelectric detector or an ionization smoke detector. In response to receiving an indication from the detector 32 that a fire is present in the cargo compartment 12, the control computer 26 instructs the suppression system 10 to deploy the suppression agent in an initial mode of operation, which is referred to as a knock-down discharge mode.

The control computer 26 then instructs the suppression system 10 to release the suppression agent in a subsequent mode of operation, which is referred to as a metering discharge mode. The suppression agent is deployed at a lower flowrate during the metering discharge mode when compared to the knock-down discharge mode. In contrast to the knock-down discharge mode, the second discharge deploys the suppression agent gradually over a longer period of time, or for the remainder of a journey to prevent re-ignition. As explained below, unlike some conventional systems that require two distinct nozzles, the nozzles 24 are configured to deploy the suppression agent in both the knock-down discharge mode and the metering discharge mode.

Although FIG. 1 illustrates the suppression system 10 placed within the cargo compartments of the vehicle 14, it is to be appreciated that the suppression system 10 is not limited to aircraft or other transport vehicles. Instead, the disclosed suppression system 10 may be used in a variety of other applications such as, for example, office buildings, warehouses, and storage spaces. Furthermore, although FIG. 1 illustrates the nozzles 24 as part of the suppression system 10, it is to be appreciated that the nozzles 24 may be employed in any application delivering both a high-pressure fluid and a low-pressure fluid. For example, the disclosed nozzles 24 may be used in heating or air conditioning systems. Furthermore, it is to be appreciated that the high-pressure fluid and the low-pressure fluid discharged by the nozzles 24 is not limited to a suppression agent and may be any type of liquid or gas.

Figure 2:
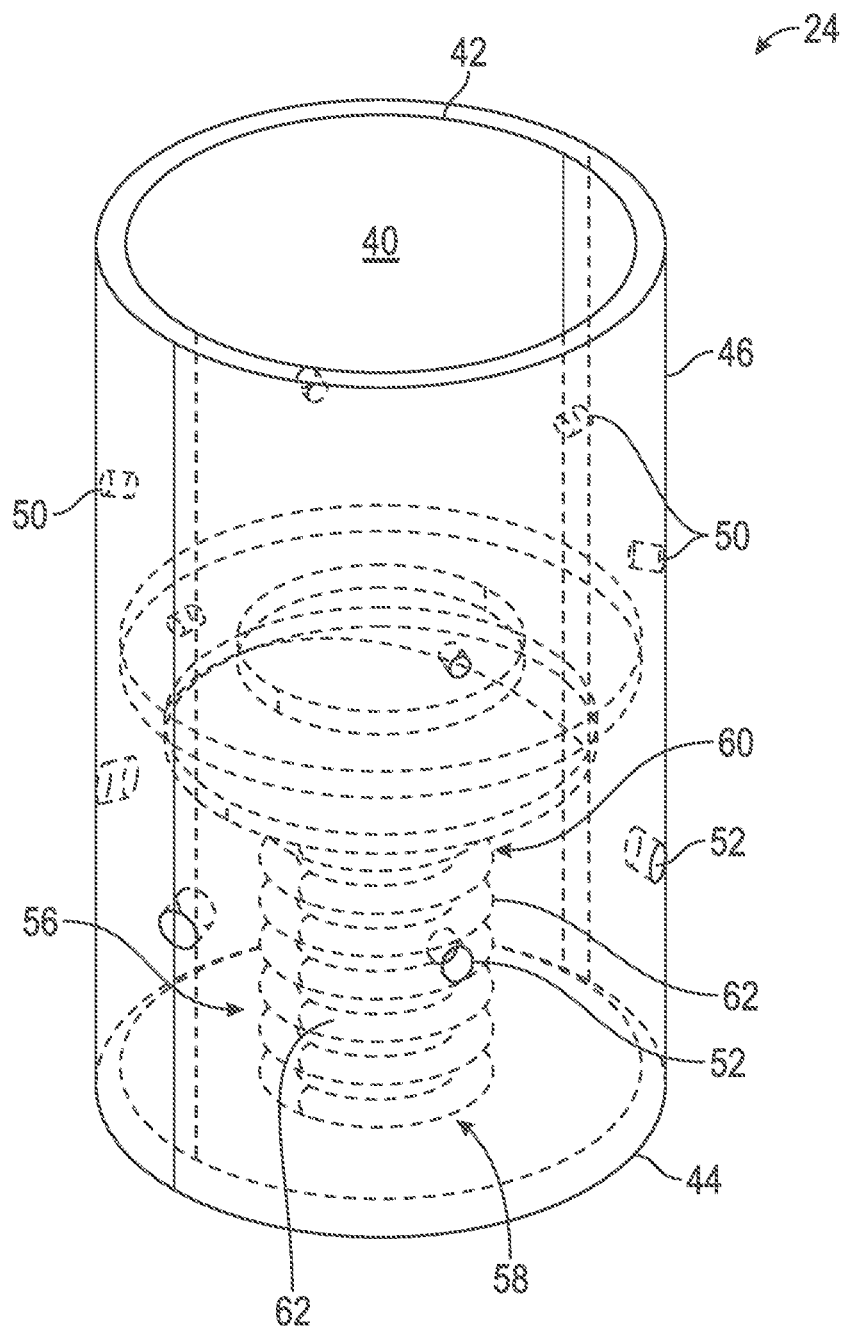
FIG. 2 is a perspective view of a dual-mode nozzle, according to an exemplary embodiment.

FIG. 2 is a perspective, transparent view of one embodiment of the nozzle 24. As mentioned above, the nozzle 24 is configured to receive and disperse a high-pressure fluid or a low-pressure fluid. The nozzle includes a nozzle body 40 defining an open end 42, a closed end 44, and a side wall 46 connecting the open end 42 to the closed end 44. The open end 42 of the nozzle body 40 is configured to receive and disperse either the high-pressure fluid or the low-pressure fluid. Specifically, the flow of either the high-pressure fluid or the low-pressure fluid is referred to as F (seen in FIGS. 3 and 4). The side wall 46 of the nozzle body 40 defines a plurality of low-pressure apertures 50 and a plurality of high-pressure apertures 52 positioned downstream from the plurality of low-pressure apertures 50. The nozzle 24 also includes a compressible member 56 positioned within the nozzle body 40. In the embodiment as shown in FIG. 2, the compressible member 56 is a poppet valve 58 including a poppet 60 and a biasing element 62. However, as seen in FIGS. 5-8, the compressible member 56 is not limited to a poppet valve.

Figure 3:
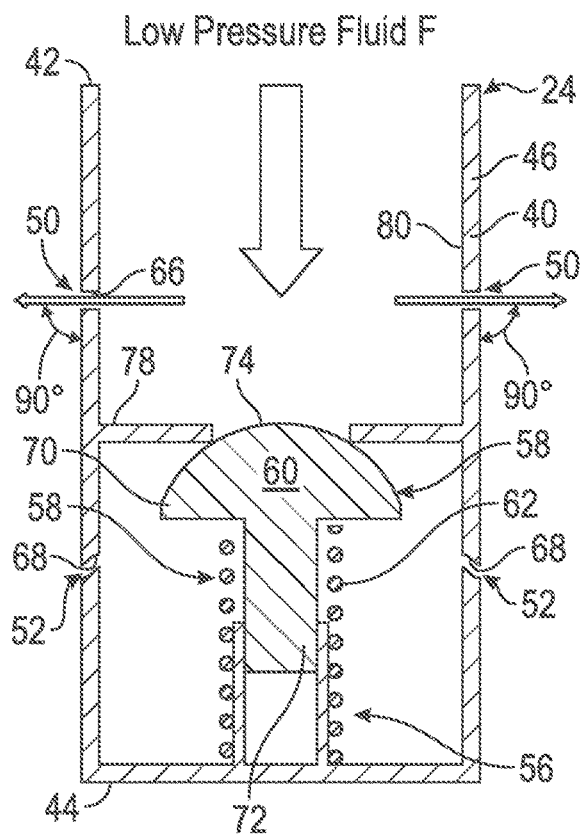
FIG. 3 is a cross-sectioned view of the dual-mode nozzle shown in FIG. 2 in a constricted position, according to an exemplary embodiment.
Figure 4:
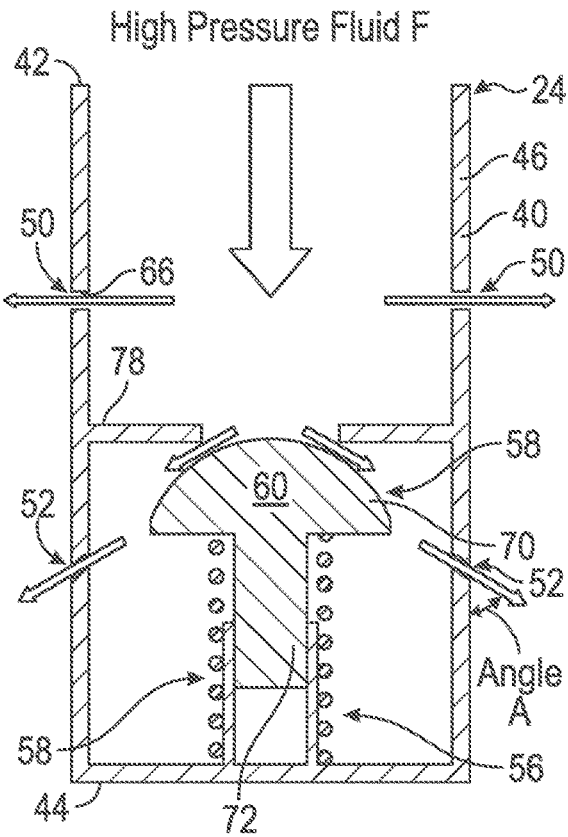
FIG. 4 is a cross-sectioned view of the dual-mode nozzle shown in FIG. 2 in an expanded position, according to an exemplary embodiment.

FIGS. 3 and 4 are cross-sectioned views of the nozzle shown in FIG. 2. Specifically, FIG. 3 illustrates the low-pressure fluid F entering the open end 42 of the nozzle body 40, and FIG. 4 illustrates the high-pressure fluid F entering the open end 42 of the nozzle body 40. The low-pressure fluid F corresponds to the metered discharge mode of the suppression system 10 (seen in FIG. 1), and the high-pressure fluid corresponds to the knock-down discharge mode of the suppression system 10. Referring specifically in the FIG. 3, the compressible member 56 is in an expanded position and blocks the plurality of high-pressure apertures 52 when the open end 42 of the nozzle body 40 receives the low-pressure fluid F. Accordingly, the low-pressure fluid F exits the nozzle body 40 through only the low-pressure apertures 50. Referring now to FIG. 4, the compressible member 56 is configured to compress into a constricted position in response to the open end 42 of the nozzle body 40 receiving the high-pressure fluid F. The compressible member 56 uncovers the plurality of high-pressure apertures 52 when compressed into the constricted position. Therefore, the high-pressure fluid F exits the nozzle body 40 through both the low-pressure apertures 50 and the high-pressure apertures 52.

It is to be appreciated that the low-pressure apertures 50 define an opening 66 within the side wall 46 of the nozzle body 40. Similarly, the high-pressure apertures 52 define an opening 68 within the side wall 46 of the nozzle body 40. The openings 66 defined by the low-pressure apertures 50 are of a smaller size when compared to the openings 68 defined by the high-pressure apertures 52. The low-pressure apertures 50 are sized to create a predetermined pressure drop across the low-pressure apertures 50 to create a predetermined flow rate through the nozzle 24. Specifically, the low-pressure apertures 50 are smaller in size by a predefined ratio when compared to the high-pressure apertures 52. The predefined ratio is based in part on one or more physical properties of the fluid entering the open end 42 of the nozzle body 40. The physical properties of the fluid include, but are not limited to, type of fluid, a state of the fluid, density, viscosity, boiling point, working pressure, and temperature. The state of the fluid indicates if the fluid is in the form of a liquid or a gas.

In addition to the physical properties of the fluid entering the open end 42 of the nozzle body 40, the predefined ratio is further based on characteristics of the overall system employing the nozzle 24. In one embodiment, the predefined ratio is also based on a flow rate of the overall system, a number of nozzles included in the overall system, a diameter of the tubing in the overall system (e.g., diameter of the pipes 30 in FIG. 1), and a predetermined flow balance of the overall system. If the fluid entering the open end 42 of the nozzle body 40 is a suppression agent, then the predetermined ratio is sized such that the suppression agent fully flashes to gas when exiting the nozzle 24. In one non-limiting embodiment, the predetermined ratio is about 0.6 to 1. However, it is to be appreciated that this embodiment is merely exemplary in nature, and other ratios may be used as well.

Referring to FIG. 4, the plurality of high-pressure apertures 52 extend though the side wall 46 of the nozzle body 40 at an angle A. Specifically, in the non-limiting embodiment as shown in FIG. 4, the angle A is about forty-five degrees with respect to the side wall 46 of the nozzle body 40 in a downward direction. Because the plurality of high-pressure apertures 52 are angled in a downward direction, the high-pressure fluid F is directed downwardly into a room, such as the cargo compartments 12 seen in FIG. 1. Angling the high-pressure fluid F downwardly may promote enhanced mixing of the suppression agent within the cargo compartment 12. In contrast, in an embodiment the plurality of low-pressure apertures 50 extend through the side wall 46 of the nozzle body 40 in a direction that is transverse with respect to the side wall 46 of the nozzle body 40. Accordingly, the fluid exiting the plurality of low-pressure apertures 50 is directed in a substantially horizontal direction. Thus, since many suppression agents are heavier than air, this arrangement replenishes the supply of suppression agent near a ceiling of the cargo compartments 12 (the ceiling is not visible in FIG. 1). Alternatively, in another embodiment, the plurality of low-pressure apertures 50 may extend through the side wall 46 of the nozzle body 40 at a slight angle instead.

The compressible member 56 includes the poppet 60, where the poppet 60 has a head portion 70 and a stem portion 72. The biasing element 62 is disposed at least partially around the stem portion 72 of the poppet 60. As seen in FIG. 3, the head portion 70 of the poppet 60 obstructs the plurality of high-pressure apertures 52 when the compressible member 56 is in the expanded position. Specifically, an upper rounded surface 74 of the head portion 70 of the poppet 60 abuts against and creates a seal against a ledge 78. The ledge 78 is disposed along an inner wall 80 of the nozzle body 40. The seal between the upper rounded surface 74 of the head portion 70 of the poppet 60 and the ledge 78 blocks the flow of the low-pressure fluid F to the plurality of high-pressure apertures 52.

Figure 5:
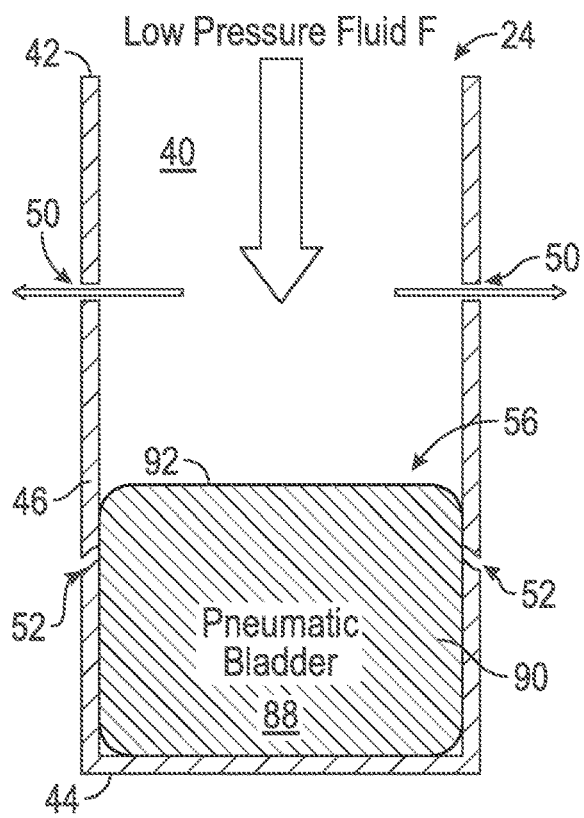
FIG. 5 is a cross-sectioned view of another embodiment of the dual-mode nozzle in the constricted position, according to an exemplary embodiment.
Figure 6:
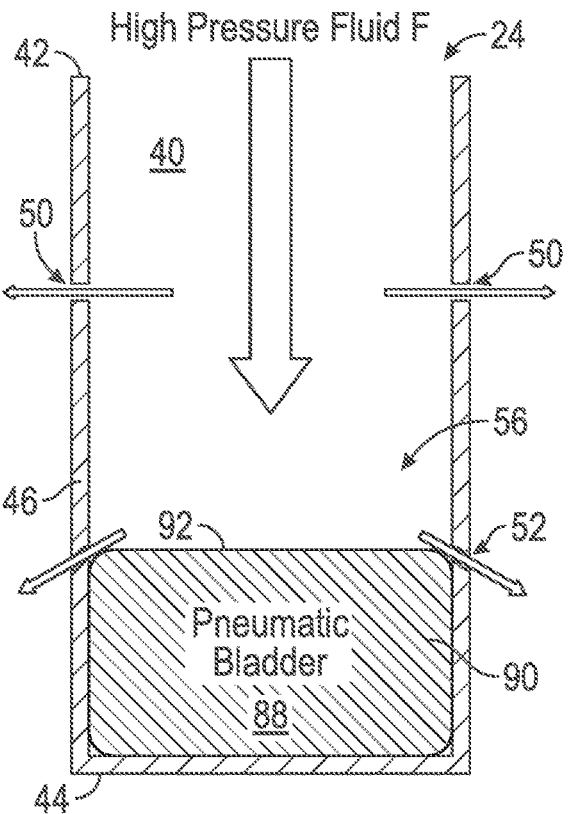
FIG. 6 is a cross-sectioned view of another embodiment of the dual-mode nozzle in the expanded position, according to an exemplary embodiment.

FIGS. 5 and 6 illustrate another embodiment of the nozzle 24, where the compressible member 56 is a pneumatic bladder 90 disposed at the closed end 44 of the nozzle body 40. The pneumatic bladder 90 is an inflatable hollow body 88 constructed of a flexible material such as, for example, rubber or silicon. The hollow body 88 of the pneumatic bladder 90 is inflated with gas such as, for example, air, hydrogen, helium, and nitrogen. Referring to FIG. 5, when the pneumatic bladder 90 is in the expanded position the outer surface 92 of the hollow body 88 blocks the plurality of high-pressure apertures 52. When the gas is compressed within the pneumatic bladder 90, the pneumatic bladder 90 is compressed into the constricted position seen in FIG. 6. When in the constricted position, the outer surface 92 of the pneumatic bladder 90 no longer blocks off the plurality of high-pressure apertures 52.

Figure 7:
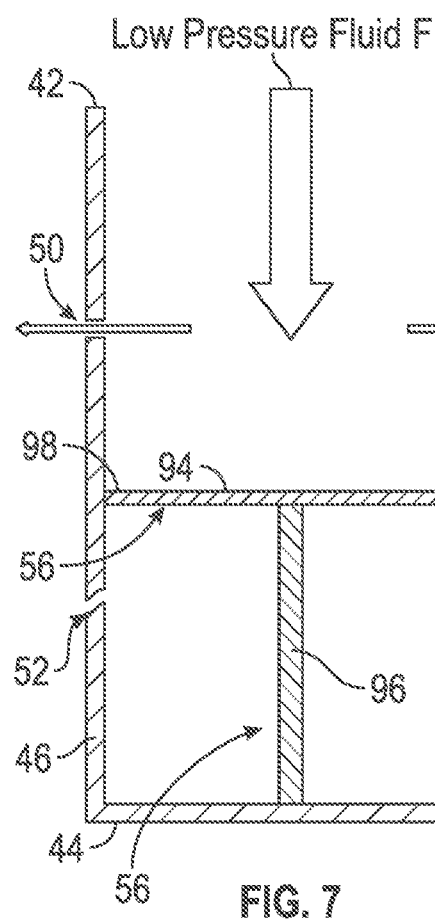
FIG. 7 is a cross-sectioned view of yet another embodiment of the dual-mode nozzle in the constricted position, according to an exemplary embodiment.
Figure 8:
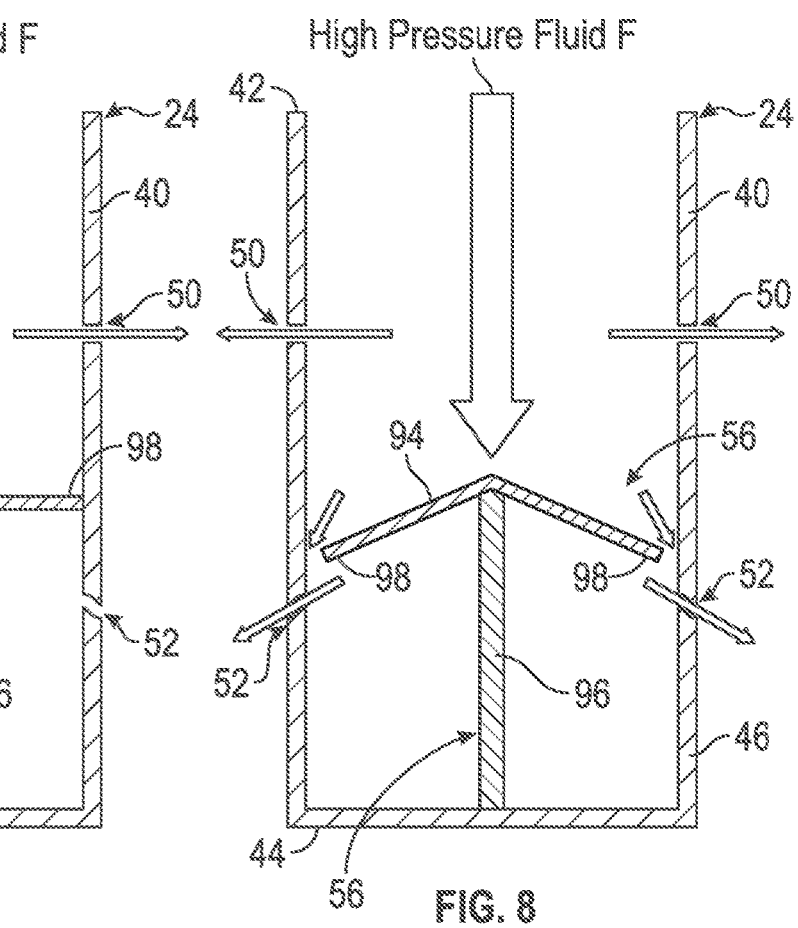
FIG. 8 is a cross-sectioned view of yet another embodiment of the dual-mode nozzle in the expanded position, according to an exemplary embodiment.

FIGS. 7 and 8 illustrate yet another embodiment of the compressible member 56. In the embodiment as shown, the compressible member 56 includes a flexible membrane 94 held in place by a support member 96. The flexible membrane 94 is constructed of materials such as, for example, silicon or rubber. In contrast to the flexible membrane 94, the support member 96 is constructed of a stiff material that positions and supports the flexible membrane 94 within the nozzle body 40.

The flexible membrane 94 includes a pair of opposing ends 98. In the embodiment as shown, the compressible member 56 is positioned in a direction that is substantially transverse with respect to a flow direction of either the high-pressure fluid F or the low-pressure fluid F, and the support member 96 is positioned in a direction that is substantially parallel with respect to the flow direction of either the high-pressure fluid F or the low-pressure fluid F. The support member 96 is positioned against the closed end 44 of the nozzle body 40. As seen in FIG. 7, the opposing ends 98 of the flexible membrane 94 abut against the side wall 46 of the nozzle body 40 when the compressible member 56 is in the expanded position to create a seal between the flexible membrane 94 and the side wall 46 of the nozzle body 40. As seen in FIG. 8, when the high-pressure fluid F enters the open end 42 of the nozzle body 40, the high-pressure fluid F urges the opposing ends 98 of the flexible membrane 94 downwardly, thereby uncovering the plurality of high-pressure apertures 52.

Figure 9:
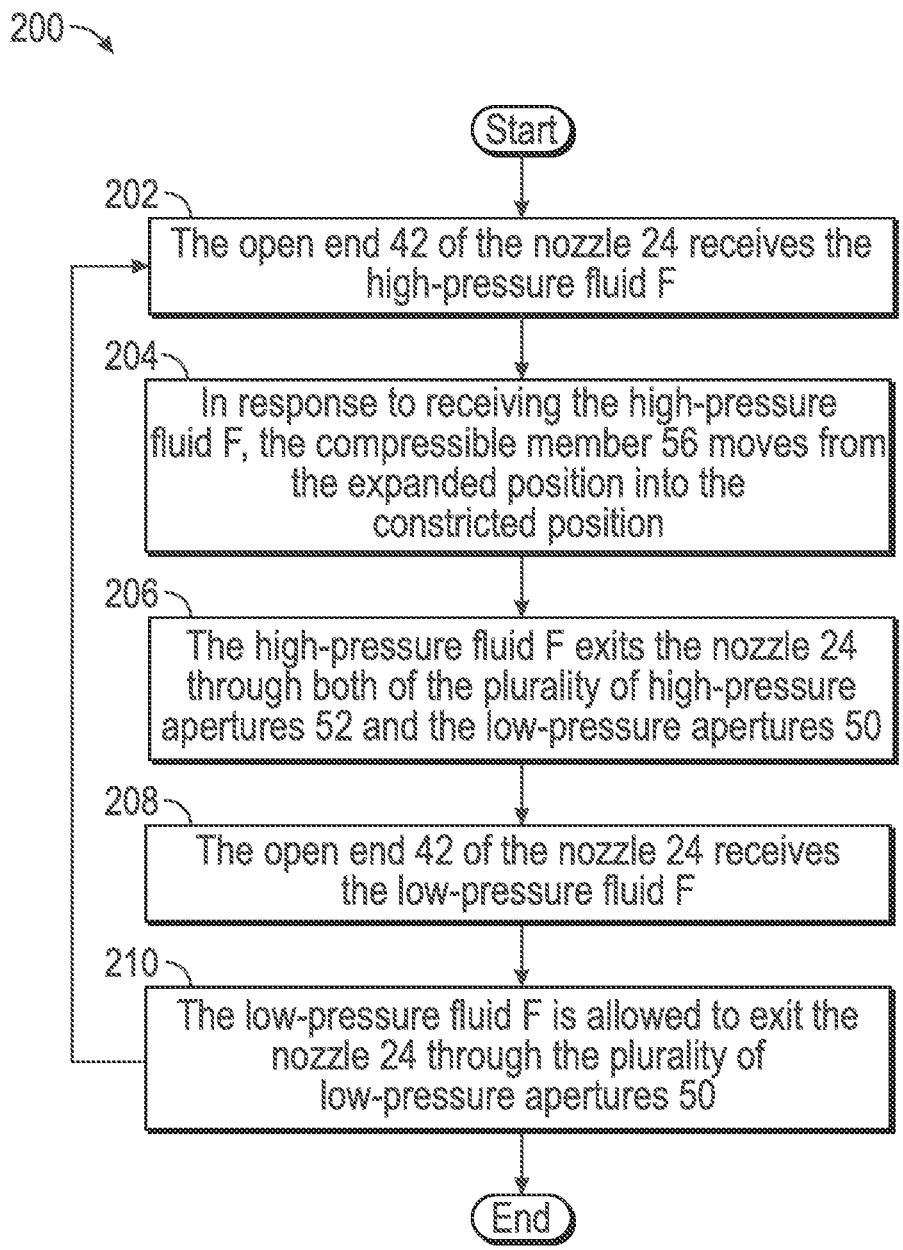
FIG. 9 is a process flow diagram illustrating a method of operating the nozzle shown in FIGS. 2-8, according to an exemplary embodiment.

FIG. 9 is a process flow diagram illustrating an exemplary method 200 of operating the nozzle 24 shown in FIGS. 2-8. As discussed above, the nozzle 24 includes the nozzle body 40 defining the open end 42 and the closed end 44. Referring generally to FIGS. 2-9, the method begins at block 202. In block 202, the open end 42 of the nozzle 24 receives the high-pressure fluid F (seen in FIGS. 4, 6, and 8). The method 200 may then proceed to block 204.

In block 204, in response to receiving the high-pressure fluid F, the compressible member 56 moves from the expanded position (FIGS. 3, 5, and 7) into the constricted position (seen FIGS. 4, 6, and 8) to uncover the plurality of high-pressure apertures 52. As mentioned above, the plurality of high-pressure apertures 52 are located downstream of the plurality of low-pressure apertures 50. The method 200 may then proceed to block 206.

In block 206, the high-pressure fluid F exits the nozzle 24 through both of the plurality of high-pressure apertures 52 and the plurality of low-pressure apertures 50. The method 200 may then proceed to block 208.

In block 208, the open end 42 of the nozzle 24 receives a low-pressure fluid F. The low-pressure fluid F is seen in FIGS. 3, 5, and 7. The method 200 may then proceed to block 210.

In block 210, the low-pressure fluid F is allowed to exit the nozzle 24 through the plurality of low-pressure apertures 50. The method 200 may then return to block 202 or terminate.

Figure 10A:
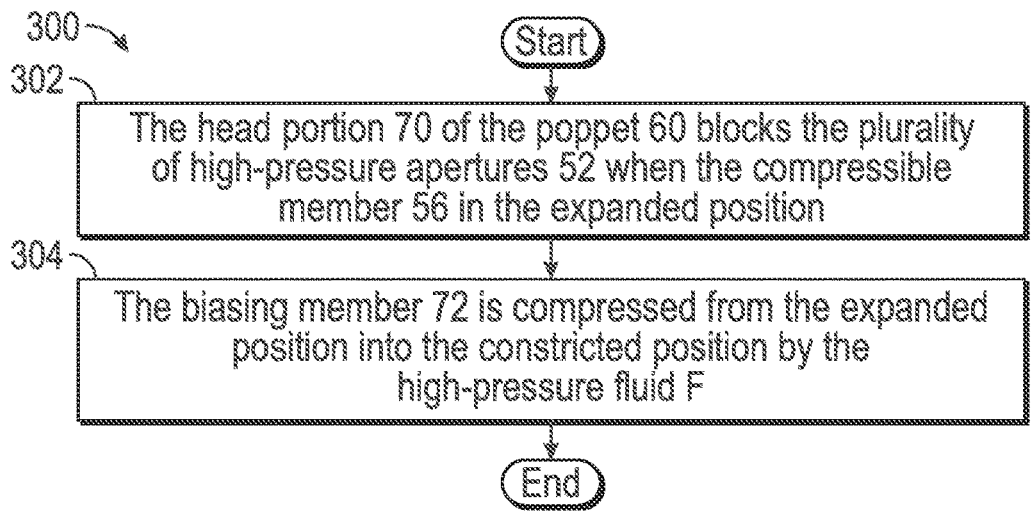
FIGS. 10A-10C illustrate various methods of operating the different nozzles shown in FIGS. 2-8, according to an exemplary embodiment.
Figure 10B:
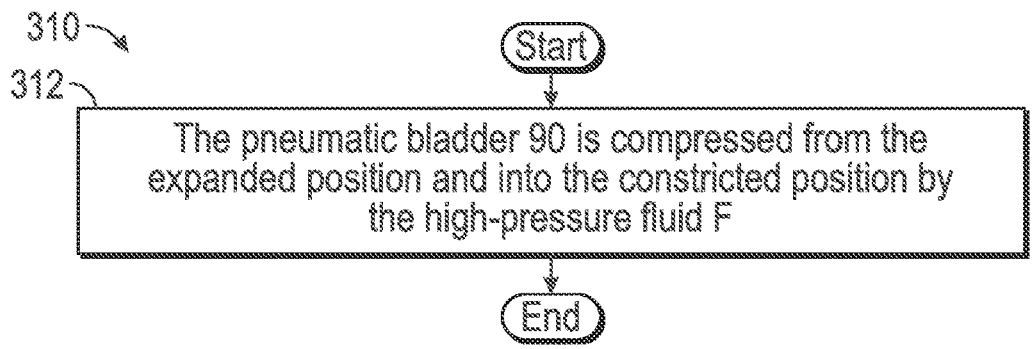
Figure 10C:
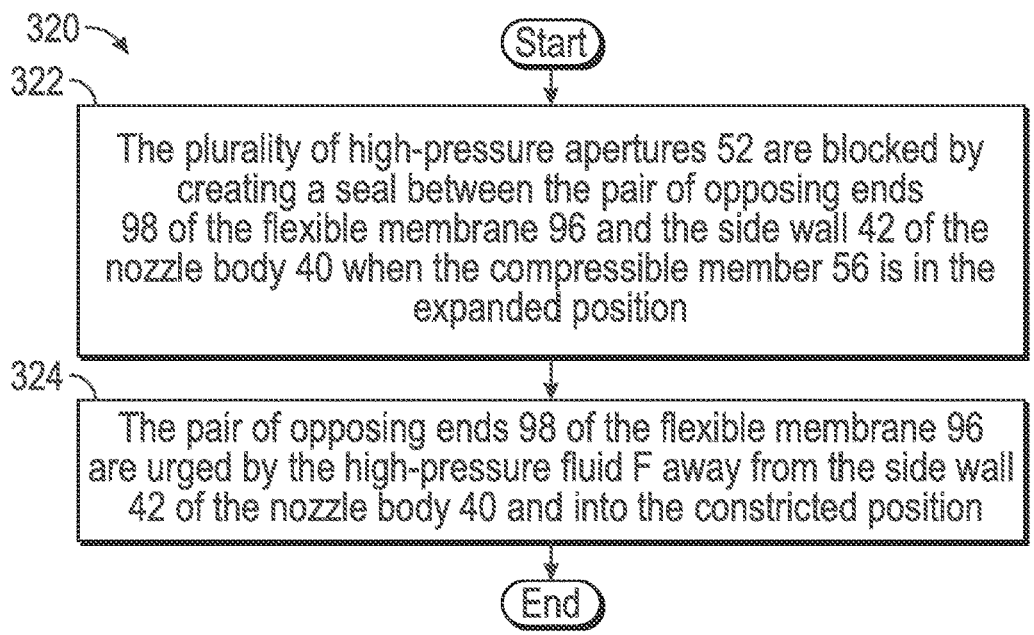

As seen in FIGS. 3-8 above, the compressible member 56 may include a variety of configurations. FIGS. 10A-10C illustrate various methods for expanding the compressible member 56. For example, FIG. 10A describes a method 300 for moving the poppet 60 and the biasing element 62 shown in FIGS. 3-4 into the expanded position. The method 300 begins at block 302. In block 302, the head portion 70 of the poppet 60 blocks the plurality of high-pressure apertures 52 when the compressible member 56 is in the expanded position. The method 300 may then proceed to block 304.

In block 304, the biasing element 62 is compressed from the expanded position into the constricted position by the high-pressure fluid F, where the head portion 70 of the poppet 60 uncovers the plurality of high-pressure apertures 52 in the constricted position. The method 300 may then terminate.

FIG. 10B illustrates a method 310 for expanding the pneumatic bladder 90 shown in FIGS. 5-6. Method 310 begins at block 312. In block 312, the pneumatic bladder 90 is compressed from the expanded position (FIG. 5) and into the constricted position (FIG. 6) by the high-pressure fluid F. The method 310 may then terminate.

FIG. 10C illustrates a method 320 for constricting the flexible membrane 94 shown in FIGS. 7 and 8 into the constricted position. As mentioned above, the compressible member 56 includes the flexible membrane 94 that is held in place by the support member 96. The method 320 begins at block 322. In block 322, the plurality of high-pressure apertures 52 are blocked by creating a seal between the pair of opposing ends 98 of the flexible membrane 94 and the side wall 46 of the nozzle body 40 when the compressible member 56 is in the expanded position. The method 320 may then proceed to block 324.

In block 324, the pair of opposing ends 98 of the flexible membrane 94 are urged by the high-pressure fluid F away from the side wall 46 of the nozzle body 40 and into the constricted position. The method 320 may then terminate.

Figure 11:
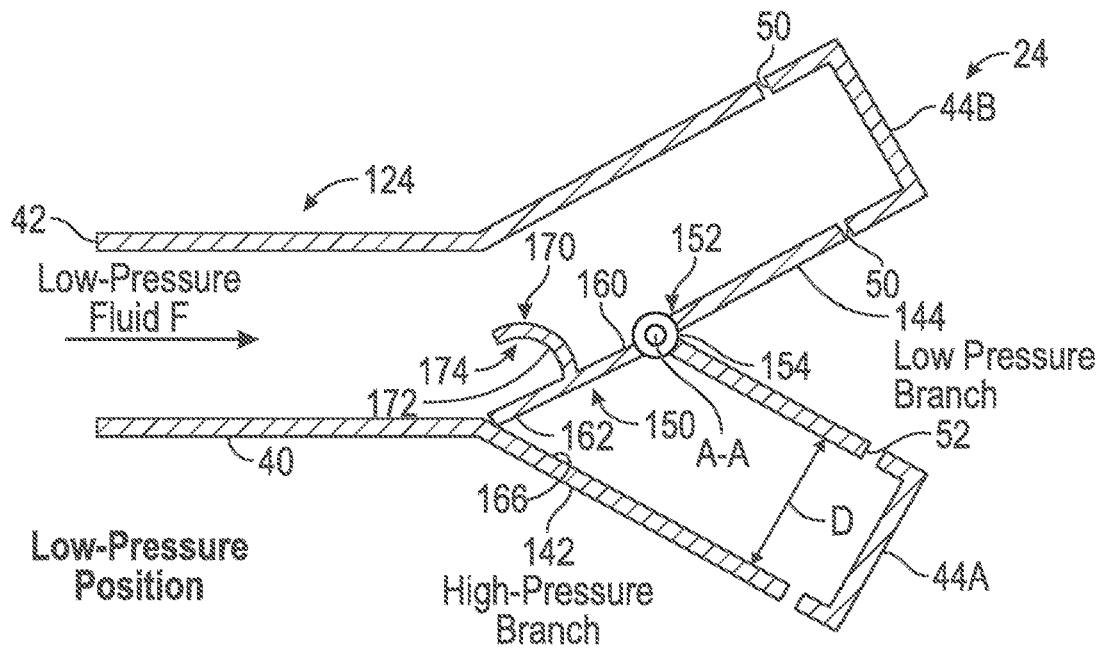
FIG. 11 illustrates an alternative embodiment of the nozzle as a two-way nozzle, where the two-way nozzle is shown in a low-pressure position, according to an exemplary embodiment.

Turning now to FIG. 11, in an alternative embodiment the nozzle 24 is a two-way nozzle 124. Similar to the embodiment shown in FIG. 3-8, the two-way nozzle 124 is configured to receive and disperse the high-pressure fluid F or the low-pressure fluid F. The two-way nozzle 124 includes the nozzle body 40, which defines the open end 42, a high-pressure branch 142, and a low-pressure branch 144. The high-pressure branch 142 defines a high-pressure closed end 44A and the low-pressure branch 144 defines a low-pressure closed end 44B. The nozzle body 40 further defines the plurality of low-pressure apertures 50 positioned at the low-pressure branch 144, and the plurality of high-pressure apertures 52 positioned at the high-pressure branch 142, where the low-pressure apertures 50 are smaller in size by the predefined ratio when compared to the high-pressure apertures 52.

A diverter gate 150 is positioned within the nozzle body 40 between the high-pressure branch 142 and the low-pressure branch 144. The diverter gate 150 is moveable between a high-pressure position (seen in FIG. 12) and a low-pressure position (seen in FIG. 11). The diverter gate 150 blocks the flow of fluid to the low-pressure branch 144 when in the high-pressure position and blocks the flow of fluid to the high-pressure branch 142 when in the low-pressure position. As explained below, the diverter gate 150 defines a scoop 170 shaped to collect a portion of the fluid entering the two-way nozzle 124.

Figure 12:
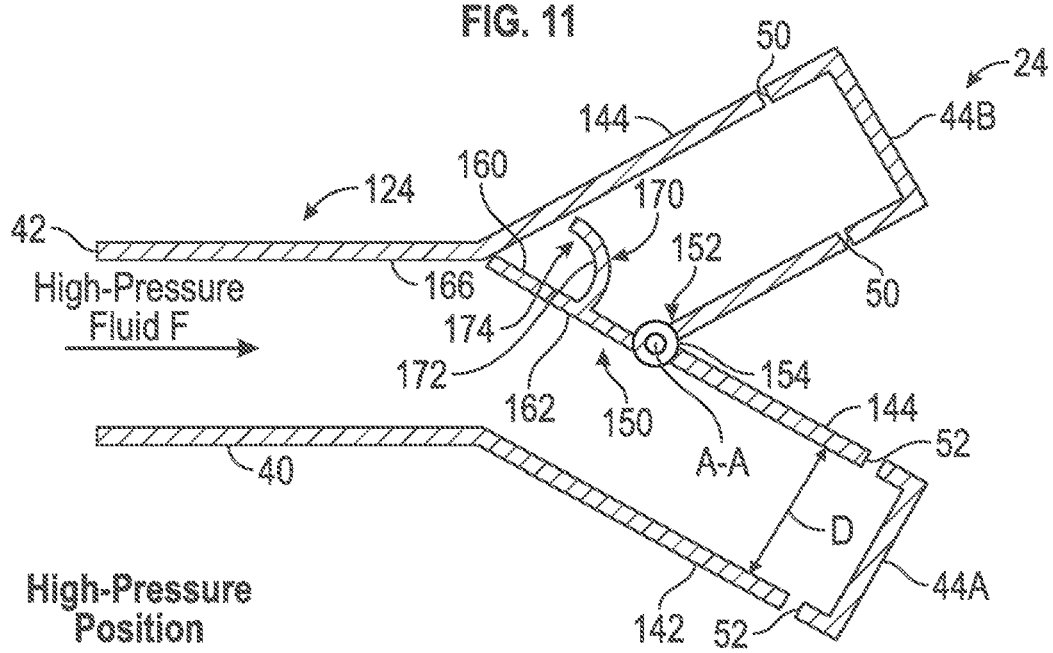
FIG. 12 illustrates the two-way nozzle in a high-pressure position, according to an exemplary embodiment.

In the embodiment as shown in FIGS. 11 and 12, the high-pressure branch 142 and the low-pressure branch 144 are both joined together at a junction 152 of the two-way nozzle 124. A biasing element 154 is positioned within the nozzle body 40 at the junction 152. The biasing element 154 is operatively connected to the diverter gate 150 and is normally biased in the low-pressure position seen in FIG. 11. The biasing element 154 is any spring-loaded element configured to exert a biasing force upon the diverter gate 150 such as, for example, a coil spring. The biasing element 154 is configured to exert the biasing force upon the diverter gate 150, where the biasing force normally biases the diverter gate 150 in the low-pressure position. The biasing element 154 is positioned at an axis of rotation A-A of the diverter gate 150. As explained below, the diverter gate 150 is configured to rotate about the axis A-A between the low-pressure position and the high-pressure position.

The diverter gate 150 defines two opposing surfaces, namely a high-pressure surface 160 and a low-pressure surface 162. The high-pressure surface 160 of the diverter gate 150 seals against an inner wall 166 of the nozzle body 40 at the high-pressure branch 142 to block off the low-pressure fluid F when the diverter gate 150 is in the low-pressure position in FIG. 11. The low-pressure surface 162 seals against the inner wall 166 of the nozzle body 40 at the low-pressure branch 144 to block off the high-pressure fluid F when the diverter gate is in the high-pressure position seen in FIG. 12. The spring constant of the biasing element 154 is based on various characteristics of the two-way nozzle 124 and characteristics of the fluid. As explained below, a force is exerted upon the diverter gate 150, and overcomes the biasing force exerted by the biasing element 154 to urge the diverter gate 150 from the low-pressure position and into the high-pressure position.

The scoop 170 is disposed along the high-pressure surface 160 of the diverter gate 150. The scoop 170 defines an inner surface 172 that is shaped to capture fluid flowing within the two-way nozzle 124. Specifically, the inner surface 172 of the scoop 170 is shaped to capture a portion of either the high-pressure fluid F or the low-pressure fluid F. The inner surface 172 of the scoop 170 defines an upper shelf 174. Referring to FIG. 11, when the diverter gate 150 is positioned in the low-pressure position, the low-pressure fluid F captured within the upper shelf 174 of the scoop 170 does not create a force sufficient to overcome the biasing force exerted by the biasing element 154 to urge the diverter gate 150 into the high-pressure position. However, the high-pressure fluid F captured within the upper shelf 174 of the scoop 170 creates a force sufficient to overcome the biasing force exerted upon the diverter gate 150 by the biasing element 154. Accordingly, the diverter gate 150 is urged out of the low-pressure position and rotates about the axis A-A and into the high-pressure position seen in FIG. 12. Once the diverter gate 150 has traveled more than halfway from the low-pressure position into the high-pressure position, then the force exerted upon the diverter gate 150 by the high-pressure fluid F also urges the diverter gate 150 into the high-pressure position. Once the into high-pressure surface 160 of the diverter gate 150 abuts against the inner wall 166 along the high-pressure branch 142, the diverter gate 150 is in the high-pressure position. The high-pressure fluid F exerts a force upon the low-pressure surface 162 of the diverter gate 150, thereby keeping the diverter gate 150 in the high-pressure position.

Figure 13:
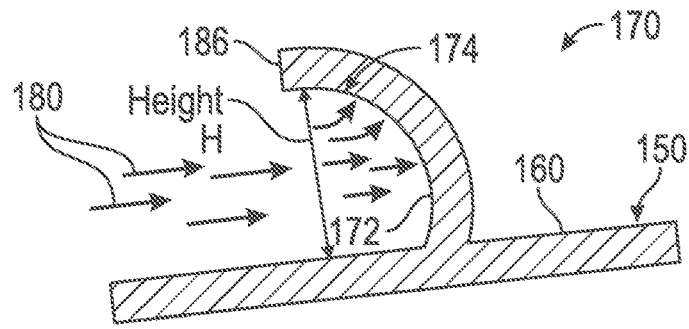
FIG. 13 is an enlarged view of a scoop that is part of a gate shown in FIGS. 11 and 12, according to an exemplary embodiment.

FIG. 13 is an enlarged view of the scoop 170 of the diverter gate 150. The arrows 180 illustrate the high-pressure fluid F impinging against the inner surface 172 of the scoop 170 against the upper shelf 174. It is to be appreciated that the force created by the high-pressure fluid F impinging against the inner surface 172 of the upper shelf 174 urges the diverter gate 150 towards the low-pressure branch 144 and into the high-pressure position shown in FIG. 12. A height H of the scoop 170 is measured between an uppermost end 186 of the scoop 170 and the high-pressure surface 160 of the diverter gate 150. The height H of the scoop 170 is based on various flow characteristics of the two-way nozzle 124. Specifically, when the height H of the scoop 170 increases, this results in an increased force that is required to overcome the biasing force exerted by the biasing element 154. It is also to be appreciated that the height H of the scoop 170 is limited by the dimensions of the nozzle body 40 as well, and in particular by a diameter D of the low-pressure branch 144.

Figure 14A:
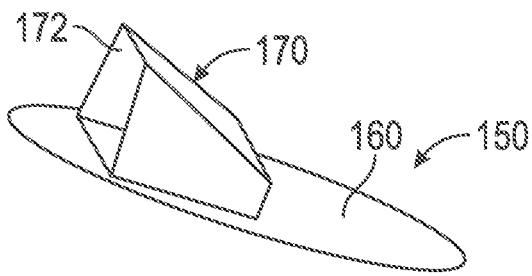
FIGS. 14A-14F illustrates various embodiments of a scoop of the nozzle shown in FIGS. 11 and 12, according to exemplary embodiments.
Figure 14B:
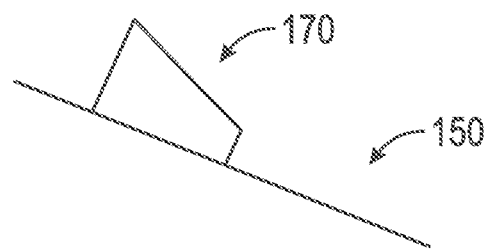
Figure 14C:
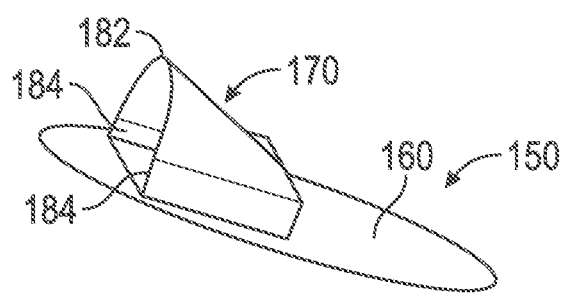
Figure 14D:
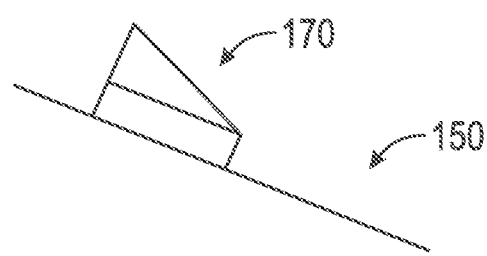
Figure 14E:
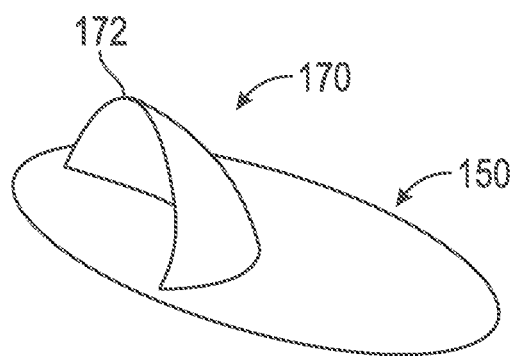
Figure 14F:
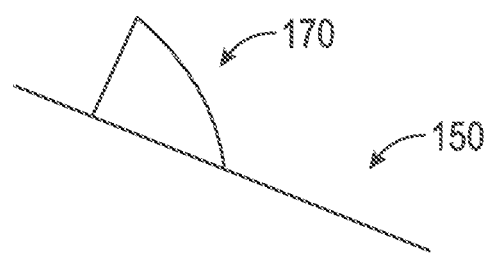

In the non-limiting embodiment as shown in FIGS. 11 and 12, the inner surface 172 of the diverter gate 150 includes a substantially circular or rounded profile, however, it is to be appreciated that this configuration is merely exemplary in nature. For example, FIGS. 14A-14F illustrate various embodiments of the scoop 170. For example, FIGS. 14A and 14B illustrate an embodiment of the scoop 170, where FIG. 14A is a perspective view and FIG. 14B is a side view of the scoop 170. In the embodiment as shown in FIGS. 14A and 14B, the inner surfaces 172 of the scoop 170 are substantially linear and not curved. In contrast, in the embodiment as shown in FIGS. 14C and 14D, an upper inner surface 182 of the scoop 170 is curved. However, the scoop 170 further includes two inner side surfaces 184 that are not rounded or curved. Finally, FIGS. 14E and 14F illustrate the scoop 170 shown in FIGS. 11 and 12 having an inner surface 172 having a substantially circular or rounded profile. It is to be appreciated that FIGS. 14A-14F are merely exemplary in nature, and the scoop 170 is not limited to any of the embodiments as shown in the figures.

Figure 15:
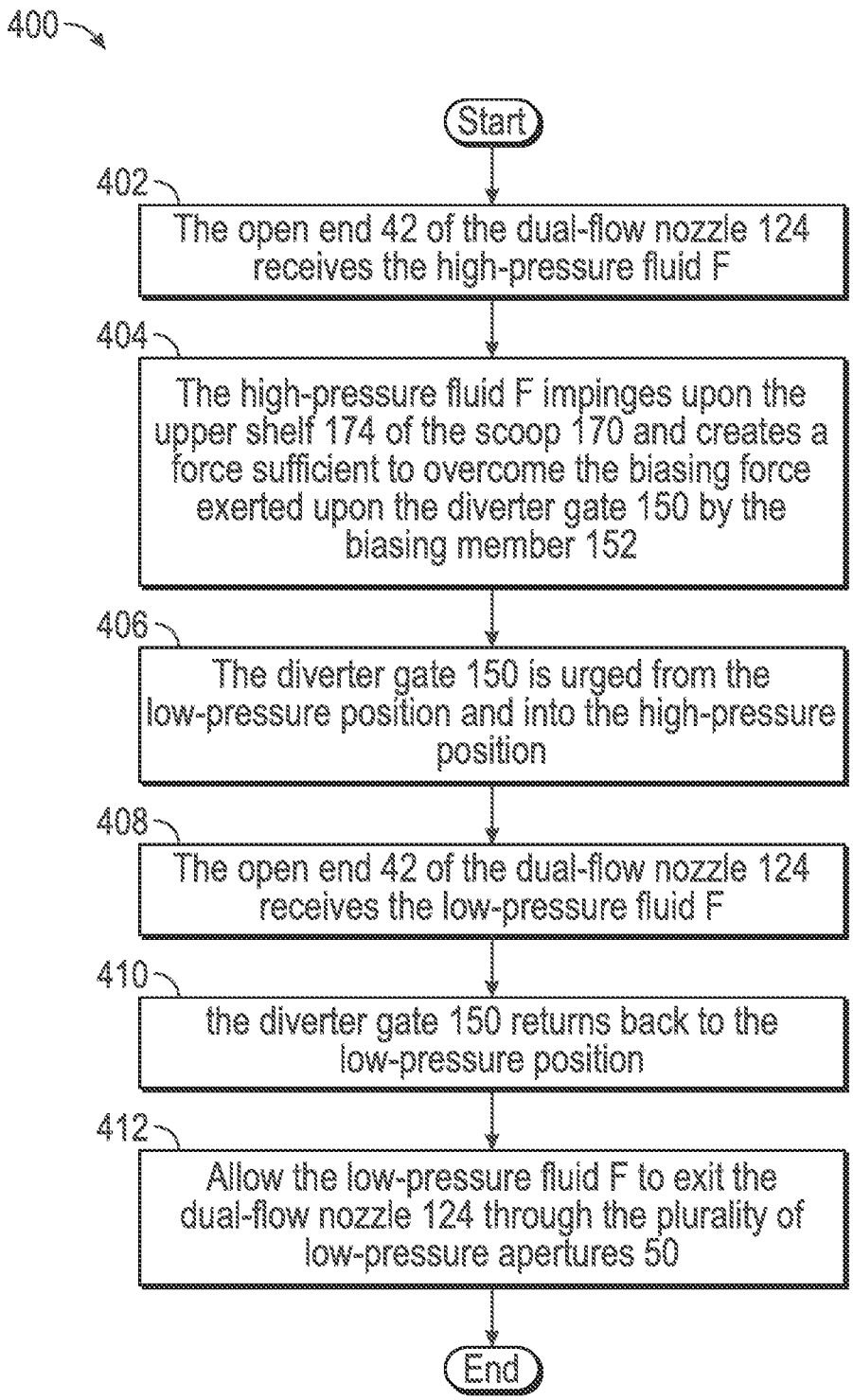
FIG. 15 is a process flow diagram illustrating a method of operating the nozzle shown in FIGS. 11 and 12, according to an exemplary embodiment.

FIG. 15 is a process flow diagram illustrating an exemplary method 400 for operating the two-way nozzle 124 shown in FIGS. 11, 12, and 13. The method 400 begins at block 402. In block 402, the open end 42 of the two-way nozzle 124 receives the high-pressure fluid F. The method 400 may then proceed to block 406.

In block 404, the high-pressure fluid impinges upon the upper shelf 174 of the scoop 170 and creates a force sufficient to overcome the biasing force exerted upon the diverter gate 150 by the biasing element 154. The method 400 may then proceed to block 406.

In block 406, the diverter gate 150 is urged from the low-pressure position and into the high-pressure position. Accordingly, the high-pressure fluid F may then exit from the two-way nozzle 124 from the high-pressure apertures 52. The method 400 may then proceed to block 408.

In block 408, the open end 42 of the two-way nozzle 124 receives the low-pressure fluid F. The method 400 proceeds to block 410.

In block 410, the diverter gate 150 returns back to the low-pressure position. The method may then proceed to block 412.

In block 412, the low-pressure fluid F is allowed to exit the two-way nozzle 124 through the plurality of low-pressure apertures 50 located along the low-pressure branch 144. The method 400 may then return to block 402 or terminate.

Referring generally to the figures, the disclosed nozzles provide various technical effects and benefits when compared to conventional nozzles. Specifically, the disclosed nozzle includes low-pressure apertures that allow for low-pressure fluid to exit the nozzle. The nozzle further includes high-pressure apertures. The nozzle is configured to direct high-pressure fluid out of the nozzle through both the high-pressure apertures and the low-pressure apertures. Accordingly, the disclosed nozzle may be employed in applications that previously required two distinct nozzles. For example, some suppression systems for controlling fires require two different sets of nozzles, distribution tubing, and containers for the knock-down discharge and the metered discharge. The disclosed nozzles eliminate the need for two distinct sets of nozzles, tubing and containers. Finally, because the high-pressure aperture and the low-pressure apertures extend through the body of the nozzle at varying angles, this may further enhance mixing of the fluid.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A nozzle configured to receive and disperse a suppression agent at either a knock-down discharge mode or at a metering discharge mode, wherein the nozzle comprises:
   a nozzle body defining an open end, a closed end, and a side wall connecting the open end to the closed end, the open end of the nozzle body configured to receive the suppression agent at either the knock-down discharge mode or at the metering discharge mode, wherein the side wall defines:
   a plurality of low-pressure apertures;
   a plurality of high-pressure apertures positioned downstream from the plurality of low-pressure apertures, wherein the low-pressure apertures are smaller in size by a predetermined ratio when compared to the high-pressure apertures; and
   a compressible member positioned within the nozzle body, wherein the compressible member is in an expanded position and blocks the plurality of high-pressure apertures when the open end of the nozzle body receives the suppression agent at the metering discharge mode, and wherein the compressible member is configured to compress into a constricted position in response to the open end of the nozzle body receiving the suppression agent in the knock-down discharge mode, and wherein the predetermined ratio is sized to result in the suppression agent fully flashing to gas when exiting the nozzle.

2. The nozzle of claim 1, wherein the compressible member uncovers the plurality of high-pressure apertures when compressed into the constricted position.

3. The nozzle of claim 1, wherein the plurality of high-pressure apertures extend through the side wall of the nozzle body at an angle.

4. The nozzle of claim 3, wherein the angle is about forty-five degrees with respect to the side wall of the nozzle body.

5. The nozzle of claim 1, wherein the plurality of low-pressure apertures extend through the side wall of the nozzle body in a direction that is transverse with respect to the side wall of the nozzle body.

6. The nozzle of claim 1, wherein the compressible member comprises:
   a poppet having a head portion and a stem portion; and
   a biasing element disposed at least partially around the stem portion of the poppet, wherein the head portion of the poppet obstructs the plurality of high-pressure apertures when the compressible member is in the expanded position.

7. The nozzle of claim 1, wherein the compressible member is a pneumatic bladder.

8. The nozzle of claim 1, wherein the compressible member includes a flexible membrane held in place by a support member, wherein the flexible membrane includes a pair of opposing ends.

9. The nozzle of claim 8, wherein the opposing ends of the flexible membrane abut against the side wall of the nozzle body when the compressible member is in the expanded position.

10. The nozzle of claim 1, wherein the compressible member is positioned downstream of the plurality of low-pressure apertures.

11. The nozzle of claim 1, wherein the predetermined ratio is based in part on one or more physical properties of fluid entering the open end of the nozzle body.

12. The nozzle of claim 11, wherein the one or more physical properties of the fluid entering the open end of the nozzle include one or more of the following: a type of fluid, a state of the fluid, density, viscosity, boiling point, working pressure, and temperature.

13. The nozzle of claim 12, wherein the predetermined ratio is about 0.6:1.

14. A method of operating a dual-flow nozzle, wherein the dual-flow nozzle includes a nozzle body defining an open end and a closed end, the method comprising:
   receiving, by the open end of the nozzle body, a suppression agent at a knock-down discharge mode;
   in response to receiving the suppression agent at the knock-down discharge mode, moving a compressible member from an expanded position into a constricted position to uncover a plurality of high-pressure apertures, wherein the plurality of high-pressure apertures are located downstream of a plurality of low-pressure apertures, wherein the low-pressure apertures are smaller in size by a predetermined ratio when compared to the high-pressure apertures, and wherein the predetermined ratio is sized to result in the suppression agent fully flashing to gas when exiting the dual-flow nozzle;
   allowing the suppression agent at the knock-down discharge mode to exit the dual-flow nozzle through both of the plurality of high-pressure apertures and the plurality of low-pressure apertures;
   receiving, by the open end of the dual-flow nozzle, the suppression agent at a metering discharge mode; and
   allowing the suppression agent at the metering discharge mode to exit the dual-flow nozzle through the plurality of low-pressure apertures.

15. The method of claim 14, wherein the compressible member includes a poppet and a biasing element, and wherein the method further comprises:
   blocking the plurality of high-pressure apertures by a head portion of the poppet when the compressible member is in the expanded position; and
   compressing the biasing element from the expanded position into the constricted position by the suppression agent at the knock-down discharge mode, wherein the head portion of the poppet uncovers the plurality of high-pressure apertures in the constricted position.

16. The method of claim 14, wherein the compressible member is a pneumatic bladder, and wherein the method further comprises:
   compressing the pneumatic bladder from the expanded position and into the constricted position by the suppression agent at the knock-down discharge mode.

17. The method of claim 14, wherein the compressible member includes a flexible membrane that is held in place by a support member, and wherein the method further comprises:
   blocking the plurality of high-pressure apertures by creating a seal between a pair of opposing ends of the flexible membrane and a side wall of the nozzle body when the compressible member is in the expanded position; and
   urging the pair of opposing ends of the flexible membrane by the suppression agent at the knock-down discharge mode away from the side wall of the nozzle body and into the constricted position.

18. The nozzle of claim 7, wherein the pneumatic bladder is an inflatable body that is hollow and is inflated with gas.

19. The nozzle of claim 18, wherein the gas is one or more of the following: air, hydrogen, helium, and nitrogen.

20. The nozzle of claim 1, wherein the plurality of high-pressure apertures extend through the side wall of the nozzle body in a downward direction.

\* \* \* \* \*